US005456211A

United States Patent [19]
Stevenson

[11] Patent Number: 5,456,211

[45] Date of Patent: Oct. 10, 1995

[54] DECOLORIZING COLORIZED SKIN

[76] Inventor: Dale V. Stevenson, 940 Lake Shore Way, B-23, Lake Alfred, Fla. 33850

[21] Appl. No.: 152,600

[22] Filed: Nov. 15, 1993

Related U.S. Application Data

[63] Continuation-in-part of Ser. No. 862,354, Apr. 3, 1992, Pat. No. 5,261,353, which is a continuation-in-part of Ser. No. 608,919, Nov. 5, 1990, Pat. No. 5,101,770.

[51] Int. Cl.$^6$ .................................................. A01J 7/04
[52] U.S. Cl. .................................................. 119/157
[58] Field of Search .................................... 119/157, 158, 119/159, 14.01, 14.02

[56] References Cited

U.S. PATENT DOCUMENTS 5,101,770  4/1992  Stevenson .................................. 119/157
5,261,353  11/1993  Stevenson .................................. 119/157

Primary Examiner—Cary E. O'Connor
Assistant Examiner—Thomas Price
Attorney, Agent, or Firm—Charles A. McClure

[57] ABSTRACT

Skin disinfectant with colorizer, plus removal of the resulting color, especially for udders of milking animals. An aqueous solution of a permanganate as colorizer, a hypochlorite as disinfectant, and an organic acid as buffer is applied in a post-milking step. The resulting color provides positive visual assurance of disinfectant application. Subsequent removal of the color can be accomplished by applyication of an aqueous solution of peroxide and an organic acid. Removal of residual color is appropriate just before the next milking not only as a cleaning step but also to ensure post-milking disinfecting, and is also effective upon the hands or other skin of persons or animals however colored with permanganate or like material.

8 Claims, No Drawings

DECOLORIZING COLORIZED SKIN

This is a continuation-in-part of my patent application, Ser. No. 862,354 filed 3 Apr. 1992, to issue as U.S. Pat. No. 5,261,353; which was a continuation-in-part of my application Ser. No. 608,919, filed 5 Nov. 1990 and issued as U.S. Pat. No. 5,101,770; both of which are incorporated herein by this reference.

TECHNICAL FIELD

This invention relates to skin care, especially of the udder of animals milked for human benefit, including disinfectant means and methods, with colorization as positive visible indication that disinfectant has been applied after milking, plus optional decolorizing.

BACKGROUND OF THE INVENTION

Sanitation in food preparation is usually principally for the direct benefit of the consumer, but where the food is produced by a living animal, as in the instance of milk, it is also desirable to safeguard the animal—as well as the product—by taking suitable sanitary precautions. The udder and particularly the teats of milk animals are highly susceptible to infection from contact with flies, manure, people's hands, etc. Hence, good milking technique includes assured application of suitable disinfecting composition.

For many years the preferred germicide in disinfectants for such use has been iodine, which in elemental form is not soluble in water (though some of its salts and other combined forms are) but is soluble in alcohol and many other organic liquids. Its traditional popularity stems in part from the characteristically intransigent stain it leaves as visible evidence of its application. However, it and its customary liquid formulations foster chapping and cracking, which not only are painful but also provide new sites for infection.

Iodophors are advanced as less troublesome in these U.S. patents: Hall U.S. Pat. No. 3,663,694 (ethoxylated lanolin), Eckols U.S. Pat. No. 4,012,504 (mineral oil, with polyoxyethylene cetyl ether), Foll et al. 4,288,428 (alkylphenoxypoly[ethyleneoxy]ethanol or polyvinylpyrrolidone), Lauermann et al. U.S. Pat. No. 4,466,959 (glycerin, paraffin oil, and higher fatty acids), and Witkin (povidone-iodine complex plus hydrogen peroxide).

These resulting compositions are mostly notably more expensive than any conventional tincture of iodine. So widely diverse efforts suggest that there is a need for further improvements in this art, preferably a new departure, rather than simply more—or more varied—iodophors.

Other germicides have been made the basis of disinfectants for udder treatment. The efficacy of chlorine-containing compositions, specifically hypochlorites ("Clorox") is reported in *Journal of Dairy Science*, vol. 56, no. 1, p. 148 (January 1973) and references cited therein. However, though efficacious, they have not been generally accepted, in part because of tradition, and in part for lack of coloring or equivalent identifiability so as to enable positive monitoring that the treatment has actually been accomplished.

Lasting colorizers of hypochlorite bleaches used for different purposes also are identified in such U.S. Patents as Kitchen et al. U.S. Pat. No. 3,544,373 (phthalocyanines), Hung U.S. Pat. No. 4,536,367 (triphenylmethanes), and Sudbury U.S. Pat. No. 4,457,855 (anthraquinones), for example. However, they are not suitable for the present purpose because of their persistence.

Prince U.S. Pat. No. 3,950,554, while urging the use of a fatty acid ester plus drying oil to form a water-resistant film on udders, included a suggestion of an edible organic dye, such as carotene, as well as hypochlorites, iodophors, and/or other udder disinfectants. His teachings failed to make any appreciable impression on the art, at least in the direction suggested above as being desirable here.

My aforementioned contributions to the art included the step of applying an iodine-free colorizing and disinfecting liquid to the udder of a milk animal after milking, and the recommended optional step of decolorizing the udder by another liquid application before the next milking (if still colored). The present invention extends that usage and modifies the composition of liquid used.

SUMMARY OF THE INVENTION

A primary object of the present invention is to include visible coloration with udder disinfectant application for milk animals, preferably promptly after milking, as an indicator of disinfection.

Another object of this invention is to provide an option of udder coloration lasting until the next milking, for pre-milking removal by a decolorant, or alternatively not so long-lasting—so that no separate pre-milking udder treatment is required for decolorizing.

A further object of the invention is to eliminate or ameliorate undesired side-effects by using non-iodophoric disinfectants.

Yet another object of the invention is to decolorize human skin that may become colored by the colorizing ingredient of this invention, whether in use of the colorizing disinfectant or otherwise.

A still further object of this invention is to accomplish the foregoing objects in an effective and economical manner.

In general, the objects of the present invention are attained, in a method of udder care, by coloring such udder—in a post-milking disinfecting step—by a composition free of iodine, organic dyes, etc. The coloring informs all who see an animal with udder so marked that appropriate post-milking disinfection of it has indeed been accomplished. Moreover, this invention gives a dairy farmer or manager also the option to determine whether it is preferable to have the coloring endure until the next milking, for removal by a pre-milking decolorizing step, or whether a shorter duration is preferable. If exposure to ambient conditions for only part of the time intervening between one milking and the next suffices to decolorize an udder so colored, a pre-milking decolorizing step is not needed to legitimize coloring as an indicator of disinfection at the forthcoming milking. If a separate pre-milking application is preferred as more conclusive or for other reason(s), longer-lasting post-milking colorizing, plus pre-milking decolorizing, as disclosed in my noted patent, is readily available.

According to this invention, at post-milking, a coloring and disinfecting step is performed, by applying to the udder an aqueous anti-microbial solution colored with a permanganate at a concentration sufficient to be visible at that time and for at least a substantial part of the time intervening until the next milking. The solution may be so low in permanganate concentration that resulting coloration of the udder fades under ambient conditions by the next milking, thus rendering unnecessary (but not inadvisable) a premilking decolorizing step.

A like decolorizing may be performed on the hands or other skin of persons who have come into contact with the same colorizing agent whether by contact with the disinfectant itself or otherwise.

Other objects of the present invention, together with means and methods for attaining the various objects, will be apparent from the following description of preferred embodiments, which are presented by way of example rather than limitation.

DESCRIPTION OF THE INVENTION

By this invention, a milking animal's udder, normally bathed in an antimicrobial solution promptly after milking, is also colorized in the same disinfecting step by inclusion of a suitable iodine-free inorganic colorizing composition. The animal's colored udder serves as a visible indicator that a proper disinfecting step has actually been performed—rather than accidentally or intentionally neglected.

The resulting color should persist on an udder so treated for at least a substantial part of the time intervening from one milking to the next, such as the time required to milk an entire herd. The intensity of applied color may be so controlled that under ambient conditions it either endures to the time of the next milking or not, depending upon whether separate pre-milking bathing of the udder is deemed desirable. Obviously, if the color has disappeared by the time of the next milking, a separate pre-milking decolorizing step may be omitted. If color is still present, a decolorizing solution is applied to the udder before milking. The formulator, if not the dairy farmer or manager, can be instructed as to the user's wishes and can adjust the colorizing intensity so as to require a separate pre-milking decolorizing step or not, whichever is desired.

The preferred post-milking udder-coloring and disinfecting composition of this invention is an aqueous antimicrobial solution with an effective concentration (at least a trace) of permanganate for coloring. All erstwhile students of chemistry know the persistent purplish brown stain of permanganate, but heretofore it has not been utilized as in this invention. Preferred as the anti-microbial or disinfectant composition is hypochlorite solution (a few percent).

Both these ingredients are suitably alkali metal compositions, such as sodium hypochlorite and potassium permanganate. Recommended additional ingredients include a buffer, such as an organic acid, e.g., acetic acid, and a compatible emollient, such as lanolin.

The procedure of applying the compositions of this invention can be accomplished manually by conventional teat dip cup and sponge, or by manual or automated spraying or similar procedure. No illustration of such conventional procedures is necessary here, as they are well known to persons skilled in caring for dairy animals.

A permanganate-stained udder indicates at a glance that it was treated with disinfectant. If the treated animal engages in normal outside exposure to air, grass, and sun, the preferred concentration of permanganate may be selected higher than when confined to a barn or other covered area. Alternatively, an intermediate concentration could be used for both, whereupon the degree of coloration remaining at the next milking might also be interpreted as an indicator of the animal's activity and the ambient conditions to which it was exposed during the time period intervening between one milking and the next.

As an example, permanganate granules can be suspended within a porous membrane in a given volume of water for a given period of time or to a desired degree of coloration, with or without stirring. With moderate circulation, an hour should suffice for an ounce of potassium permanganate in a gallon of water. The water, which takes on a permanganate color, is decanted off into an appropriate aqueous hypochlorite solution of known volume. The color is conveniently controllable by adjusting either the permanganate perfusion time or the ratio of dilution (or both). With the suggested time, moderate dilution such as nine or ten times the volume of the colored water suffices for an intermediate duration of udder coloration. To be assured of color persistence to the next milking, at most half such ratio is preferable. To assure that a decolorizing step will be superfluous, at least about twice such dilution ratio is recommended. Solution color can be checked either by eye or by colorimeter, but a better empirical guide is the actually observed udder coloration in a particular dairy herd, which can be taken into account in varying the formulation method appropriately.

Moderate single-digit concentrations of sodium hypochlorite are effective to produce the desired antimicrobial action. Double-digit percentages are harmful as too caustic (pH 11 to 12). From about 4.5 to 5% hypochlorite is preferred, although the range from at least several to at most about a half dozen percent may be considered so long as the pH is about 9 to 10. Dilute organic acid, such as aqueous acetic, is useful in reducing an excessive pH. The colorizing solution can be monitored while adding such a buffer to produce a cool-weather pH of about 9 or warm-weather pH of about 10.

If, at the next milking, the residual coloration of the udder is such that someone might conclude (wrongly) after the milking that the post-milking disinfecting step had been performed, a pre-milking decolorizing step is highly recommended. Such step, like the post-milking step, may be performed by dipping, spraying, or sponging the udder appropriately. A preferred decolorizing liquid comprises an acidic aqueous peroxide solution, having several volume percent of hydrogen peroxide and of an organic acid, preferably acetic acid, respectively. Such decolorant can be applied with like effect upon human or other animal skin colored in any way with permanganate.

Aqueous solutions of hydrogen peroxide are readily available commercially in various concentrations intended for antiseptic or disinfectant use and may be used as a point of departure for making and using a two-component decolorizing composition of the invention. A ten to twelve percent commercial peroxide solution diluted with water to—or even by—several times its own volume provides a good working range of about two to four percent peroxide. A like range of acetic acid may be attained conveniently by use of vinegar, which also may be employed in the colorizing solution, if desired.

Advantages and benefits of the compositions and the methods of this invention have been noted here and are readily recognizable. Others doubtless will accrue to persons who practice the invention, as well as to milk animals upon which they practice it.

Preferred embodiments and variants of the invention have been described here. Other modifications may be made, as by adding, combining, deleting, or subdividing compositions, parts, or steps, while retaining all or some of the advantages and benefits of the present invention—which itself is defined in the following claims.

I claim:

1. Method of decolorizing animal or human skin previously colored by a permanganate, comprising applying thereto an aqueous solution of a peroxide and an organic acid in respective concentrations of about several percent each.

2. Method according to claim 1, wherein the skin has been colored by exposure to potassium permanganate.

3. Method according to claim 1, wherein the peroxide comprises hydrogen peroxide.

4. Method according to claim 1, wherein the organic acid comprises acetic acid.

5. Method of temporarily indicating comprising the steps of colorizing animal or human skin with a permanganate and subsequently decolorizing it with an effective aqueous mixture comprising an organic acid and a peroxide source.

6. Method according to claim 5, wherein said components of the mixture are present in substantially equal concentrations.

7. Method according to claim 5, wherein said organic acid comprises a lower aliphatic acid.

8. Method of removing from human or animal skin a permanganate stain comprising the steps of applying thereto a buffered aqueous peroxide source.

* * * * *